United States Patent [19]
Davey

[11] Patent Number: 5,035,260
[45] Date of Patent: Jul. 30, 1991

[54] LINE PRESSURE REGULATOR

[75] Inventor: Kenneth J. Davey, Bassendean, Australia

[73] Assignee: Fluid Technology Limited, Australia

[21] Appl. No.: 440,658

[22] Filed: Nov. 22, 1989

[30] Foreign Application Priority Data

Feb. 27, 1989 [AU] Australia .................... PJ2965

[51] Int. Cl.$^5$ .................................. G05D 16/06
[52] U.S. Cl. ......................... 137/505.18; 137/614.14
[58] Field of Search ............... 137/494, 505.18, 505.39, 137/614.14

[56] References Cited

U.S. PATENT DOCUMENTS

| 417,134 | 12/1889 | Bell | 137/505.39 X |
| 942,042 | 11/1909 | Petley | 137/505.18 X |
| 2,746,471 | 5/1956 | Cobb | 137/614.14 X |
| 3,040,765 | 6/1962 | Larkins | 137/614.14 X |
| 3,545,465 | 12/1970 | Zadoo | 137/505.18 X |

FOREIGN PATENT DOCUMENTS

| 357366 | 11/1961 | Switzerland | 137/614.14 |
| 193187 | 4/1967 | U.S.S.R. |
| 237648 | 6/1969 | U.S.S.R. |
| 798755 | 1/1981 | U.S.S.R. |
| 890370 | 12/1981 | U.S.S.R. |

Primary Examiner—Stephen M. Hepperle
Attorney, Agent, or Firm—Eckert Seamans Cherin & Mellott

[57] ABSTRACT

An in-line pressure regulator for regulating fluid flow comprising a housing having an inlet and an outlet, said housing providing a first chamber open to the inlet and having a first port open to a second chamber, a second port opening to the second chamber, the second chamber having a third port opening to the outlet, a support element movably received within the first and second chambers and accommodating a set of three valve members wherein a valve member is associated with each port; the support element being movable within the first chamber to vary the extent of engagement of the valve members with the first and second ports, said support element being biased to an end position at which the first and second ports are open, and the third port is closed, said support element supporting a pressure surface in the secondary chamber whereby the force exerted by fluid pressure in the secondary chamber on the support element counteracts the biasing force applied thereto to move the support element from its end position to a regulating position where the first and second valves are moved proximate the first and second ports to vary the degree of opening of the ports in accordance with the fluid pressure applied at the inlet whereby the fluid flow remains substantially constant over a range of inlet pressures.

3 Claims, 5 Drawing Sheets

LINE PRESSURE REGULATOR

This invention relates to a line pressure regulator for use in fluid lines whereby fluid from a high pressure source can be delivered at a controlled reduced pressure to provide a substantially constant output pressure irrespective of the input pressure.

In one form the invention resides in an in-line pressure regulator comprising a housing having an inlet and an outlet, said housing providing a first chamber open to the inlet and having a first port open to a second chamber, a second port opening to the second chamber, the second chamber having a third port opening to the outlet, a support element movably received within the first and second chambers and accommodating a set of three valve members wherein a valve member is associated with each port; the support element being movable within the first chamber to vary the extent of engagement of the valve members with the first and second ports, said support element being biased to an end position at which the first and second ports are open, and the third port is closed, said support element supporting a pressure surface in the secondary chamber whereby force exerted by fluid pressure in the secondary chamber on the support element counteracts the biasing force applied thereto to move the support element from its end position to a regulating position where the first and second valves are moved proximate the first and second ports to vary the degree of opening of the ports in accordance with the fluid pressure applied at the inlet.

The invention will be more fully understood in the light of the following description of two specific embodiments. The description is made with reference to the accompanying drawings of which;

Figure 1:
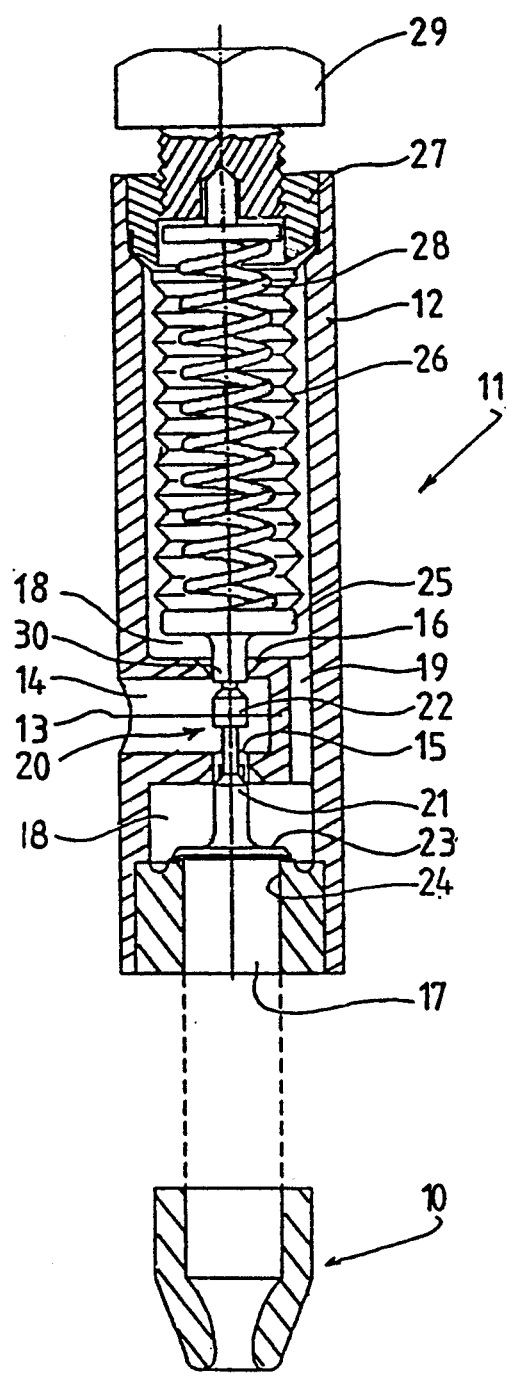
FIG. 1 is a sectional elevation of a line pressure regulator according to the first embodiment in a closed position.
Figure 2:
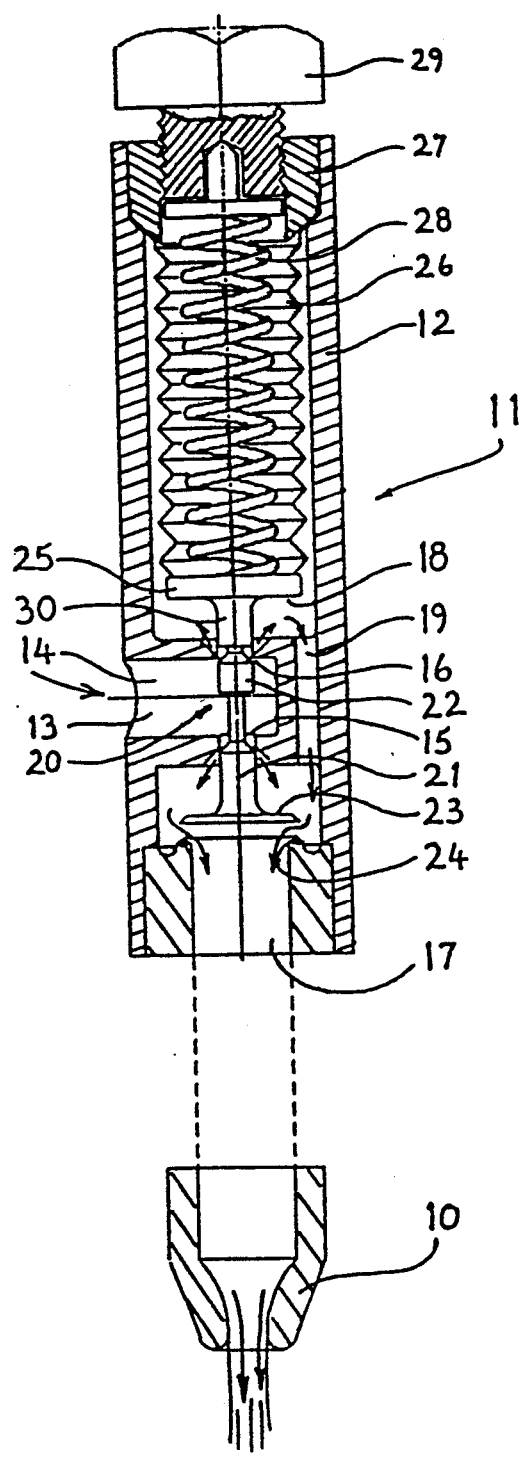
FIG. 2 is a sectional elevation of the pressure regulator of FIG. 1 in the partially open position.
Figure 3:
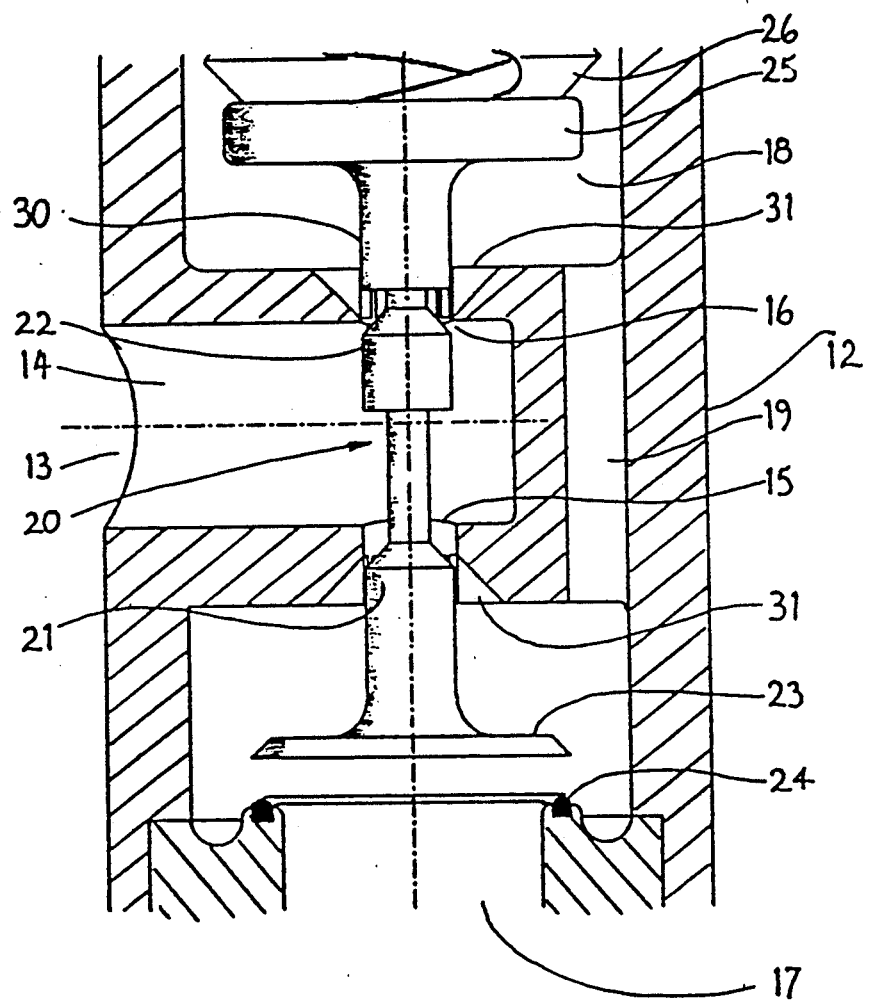
FIG. 3 is an enlarged view of the support element in position within the housing of the pressure regulator as shown at FIG. 2.

The line pressure regulator 11 as shown at FIGS. 1, 2 and 3 is intended to be utilised to deliver fluid at a substantially constant pressure to a spray nozzle 10 from a high pressure fluid source that may vary in its feed pressure. The line regulator 11 comprises a substantially tubular housing 11 having an inlet 13 provided in its side wall at an intermediate location thereof and which opens into a first chamber 14 accommodated within the tubular body 12. The opposed walls of the first chamber 14 which are in opposed relation to the ends of the tubular body 12 are each formed with a first and second port 15 and 16 respectively. The first port 15 opens to one side of a second chamber 18 to one side of the first chamber 14 which further opens to an outlet 17 provided at one end of the tubular body 12 while the second port 16 opens the other side of the second chamber provided to the other side of the first chamber 14. Both sides of the second chamber 18 communicate through a fluid passageway 19 which provides a relatively unrestricted communication between the sides of the second chamber 18. The second chamber communicates with the outlet 17 through a third port 24.

A spindle like support element 20 is received within the tubular housing 12 such that it is axially slidable through the ports 15 and 16. The support element 20 supports a set of three valve members 21, 22 and 23 which are associated with the first, second and third port 15, 16 and 24 respectively. The first and second valves are dimensioned such that they are slidably receivable through the respective first and second ports 15 and 16 with a very close tolerance therebetween.

The faces of the first and second ports 15 and 16 are fluted as shown at FIG. 3 and the depths of the flutes 31 increase as the distance from the first chamber 14 increases. In the case of the first port 15 the flutes commence at a position spaced axially from the first chamber 14 while in the case of the second port 16 the flutes commence at the entry of the second port 16 into the first chamber 14. The flutes are relieved to minimise flow resistance, but most importantly, to guide the support element 20. The end of the support element 20 adjacent the outlet 17 supports the third valve member 23 which is sealingly engagable with a valve seat provided at the third port 24 when the support element 20 is located at an end position at which position the line regulator is closed.

The other end of the support element 20 extends into the other side of the second chamber 18 and is provided with an enlarged disc-like head which is connected to a collapsible closure 26 extending between the periphery of the head 25 and a stop member 27 provided at the other end of the tubular body 12. A pressure spring 28 is accommodated within the collapsible closure 26 between the face of the enlarged head 25 remote from the other port 16 and the stop member 27. The stop member 27 is provided with a threaded stud 29 which bears against the end of the compression spring adjacent the stop 27. The extent of penetration of the stud 29 into the stop 27 serves to vary the extent of biasing force applied to the support element 20 by the spring 28. A portion of the support element adjacent the enlarged head 25 is formed with an increased diameter shank 30 which is snugly and slidably received by the flutes 31 in the other port 16 when the support element 20 is in its end position at which position the third valve member 23 is in engagement with the third port. When at the closed position the first valve member 21 is adjacent but clear of the outlet side of the one port 15 while the second valve member 22 is located within the first chamber 14 and is clear of the other port 16. The engagement of the valve members 21 and 22 and the enlarged diameter shank 30 with the respective ports 15 and 16 is not a sealing engagement at least due to the presence of the flutes 31, and as a result there is the capacity for some fluid flow therebetween when fully engaged with the respective port.

When no fluid pressure is applied to the inlet 13 and the pressure is insufficient to overcome the biassing force provided by the spring 28 as shown at FIG. 1 the biasing force provided by the spring 28 ensures engagement of the third valve member 23 with the third port 24 to close the line regulator and prevent any reverse fluid flow through the line regulator. On the application of sufficient fluid pressure to the inlet 13 as shown at FIG. 2 fluid pressure is admitted to the secondary chamber 18 through the one port 15 and passageway 19 by free passage through 15 and 19 which in turn exerts a force upon the axial face of the enlarged head member 25 adjacent the one port 16 in opposition to the biasing force provided by the spring 28. On that counteracting pressure exceeding the biasing force applied by the spring 28 the support element 20 is caused to move axially within the tubular body 12 in the direction of the stop member 27 and as a result the third valve member 23 is disengaged from the third port 24 and fluid flows into the outlet to create a higher back pressure at the outlet than that which existed at the outlet before the third member valve 23 disengaged from the third port 24. The resultant net increase in force on the support element in a direction away from the outlet due to the balancing pressure either side of the third valve member 23 causes the support element 20 to move quickly away from the end position, to a second pressure regulating position, such that the valve members 21 and 22 are brought into engagement with ports 15 and 16 respectively to restrict the flow from the first chamber 14 to second chamber 18. The passageway 19 ensures that there is little pressure differential between each side of the second chamber 18. The pressure at the outlet side of the first and second ports in the second chamber 18 is throttled by the degree of engagement of the first and second valve 21 and 22 with the first and second ports 15 and 16. Should there be a rise in the outlet pressure, the degree of engagement increases thereby increasing throttling. Thus outlet pressure is regulated to remain substantially constant irrespective of supply pressure.

Once flow commences, the first and the second valve members 21 and 22 are brought into engagement with the ports 15 and 16 respectively to reduce the degree of communication of the fluid pressure applied to the inlet to the second chamber 18. On the application of maximum fluid pressure to the inlet 13 both the first and second valve members 21 and 22 become fully engaged with the respective ports 15 and 16 whereby the only fluid flow through the ports is accommodated by the flutes and the clearance between the respective valve members and the respective ports.

Figure 5:
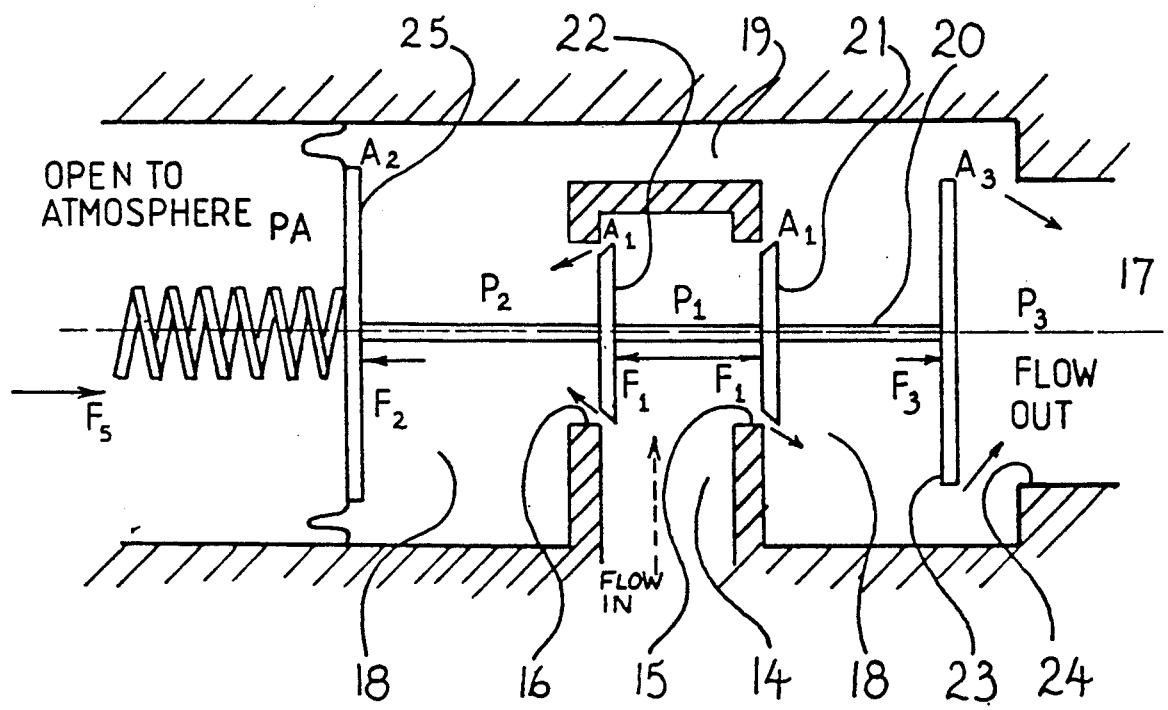
FIG. 5 is a schematic representation of each of the embodiments.

The value of the first embodiment may be schematically represented as shown at FIG. 5. When the line regulator is closed as shown at FIG. 2 the force ($F_s$) applied by the spring 28 may be represented as:

$$F_s = F_2 - F_3 + F_1 - F_1$$
$$= F_2 - F_3$$
$$= (P_2 - P_A) \cdot A_2 - (P_2 - P_3) \cdot A_3$$
$$= P_2 \cdot A_2 - (P_2 - P_3) \cdot A_3$$

($P_A = O$ pressure of $P_1$, $P_2$ and $P_3$ measured above atmospheric pressure).

Where $F$ = force
$P$ = pressure
$A$ = area

The supply pressure $P_1$ produces balancing forces $F_1$ on the first and second valves marked 21 and 22 where they are the same area A. The area $A_2$ of the enlarged head 25 is greater than the area $A_3$ of the third valve members 23. The differential force between the forces $F_2$ and $F_3$ applied to the enlarged head 25 and the third valve member 23 respectively is balanced by the force $F_s$ applied by the spring.

Under no flow conditions the third valve member 23 closes the third port 24 and thus there is no throttling by the first and second valve members 21 and 22 and therefore $$P_1 = P_2$$
$$P_3 = O$$

Under such pressure conditions that the valve member is just closed and the opening and spring pressure forces are balanced.

$$F_s = P_2 \cdot (A_2 - A_3) \text{ and}$$
$$F_s = k \cdot x$$

k is spring constant
x is initial deflection.

When the force differential ($F_2 - F_3$) applied to the enlarged head 25 just exceeds the resisting force $F_s$ of the spring 28 the third valve member 23 disengages from the third port 24.

Thus it can be seen that the strength of the spring 28 determines the value of inlet pressure $P_1$ required to open the line regulator.

When the line regulator opens and there is flow to the outlet 17 such flow generates a back pressure $P_3$ greater than atmospheric pressure $$\text{i.e. } F_s = P_2 \cdot A_2 - (P_2 - P_3) \cdot A_3$$
$$= P_2 \cdot A_2 - P_2 \cdot A_3 + P_3 \cdot A_3.$$

Assuming the losses past the third valve member 23 are small and decrease as the third valve member lifts from the third port 24 it can be assumed $$P_3 = P_2$$

Therefore opening and pressure forces are in balance.

$$F_s = P_2 \cdot A_2.$$

Therefore as soon as flow commences and produces a back pressure $P_3$ at the outlet 17 above atmospheric the net force lifting the third valve member from the valve seat increases rapidly resulting in a rapid movement of the support element 20 to its regulating position where the first and second valve members 21 and 22 engage the first and second ports 15 and 16 where flow between the inlet 14 and the second chamber is throttled to produce a differential in pressure $P_1$ and $P_2$ thereat. As a result chatter or valve flutter is at least reduced if not eliminated. The slight increase in the force $F_s$ applied by the spring 28 due to compression of the spring 28 by movement of the support element 20 is small compared with the force $F_3$ generated the back pressure $P_3$.

In addition the pressure required to maintain the third valve member in the open is less than the pressure required to move the third valve member from the closed position.

The new balance position of the support element is one at which the pressure in the second chamber is held at a level at which the force Fs applied by the spring is just balanced. If the pressure $P_2$ in the second chamber continues to increase the support element is moved to bring the first and second valve members 21 and 22 into closer engagement with the first and second ports 15 and 16 respectively to further throttle the flow between the inlet chamber 14 and second chamber 18 so as to reduce $P_2$ with respect to $P_1$.

If the inlet pressure $P_1$ is low (i.e. nearly equal to $P_2$) the extent of throttling by the first and second valve member 15 and 16 is low and resistance to flow is low. If the inlet pressure $P_1$ is much greater than the pressure $P_2$ in the second chamber 18 the throttling by the first and second valve members 15 and 16 is greater. The minimal extent of movement of the spindle required to vary the extent of throttling to control the pressure $P_2$ in the second chamber results in only a slight difference on the force $F_s$ applied by the spring 28. This implies a higher regulation of pressure for instances of a high inlet pressure than for low inlet pressures however in practice the difference in the degree of regulation has been found to be negligible.

As the inlet pressure $P_1$ falls to 0 below the minimal regulating pressure $P_2$ in the second chamber the outlet back pressure $P_3$ decreases correspondingly.

Therefore $F_s = P_2 \cdot A_3$.

At this point in time there is no significant throttling of flow through the first and second ports and the third valve member 23 is caused to be moved towards the third port 24 resulting in the throttling of fluid flow through the third port 24 i.e. $F_s = P_2 \cdot A_2 - P_2 \cdot A_3 + P_3 \cdot A_3$.

The change in the force $F_s$ applied by the spring 28 as it relaxes is minimal compared to the force differential $(F_2 - F_3)$ applied to the enlarged head 25 as the back pressure $P_3$ produced at the outlet is reduced as the throttling applied to the third port 24 by the third valve member 23 is increased which results in a positive rapid closure of the line regulator.

Since $F_s = k \cdot x$

The lower the value of the of k the lower the variation in the force $F_s$ applied by the spring 28 in the travel of the support element between the regulation position and the end position $F_s = P_2 \cdot A_2$ regulating $F_s = P_2 \cdot A_2 - P_2 A_3 + P_3 \cdot A_3$ near closure position The difference between these two positions may be expressed as $\Delta F_s = (P_2 - P_3) \cdot A_3$.

If the variation in the force $F_s$ applied by the spring 28 through its movement is small a small amount of throttling produced by the third valve member 23 results in a rapid and positive closure of the third port 24 as the pressure $P_2$ in the second chamber falls slightly below the regulating pressure.

Figure 4:
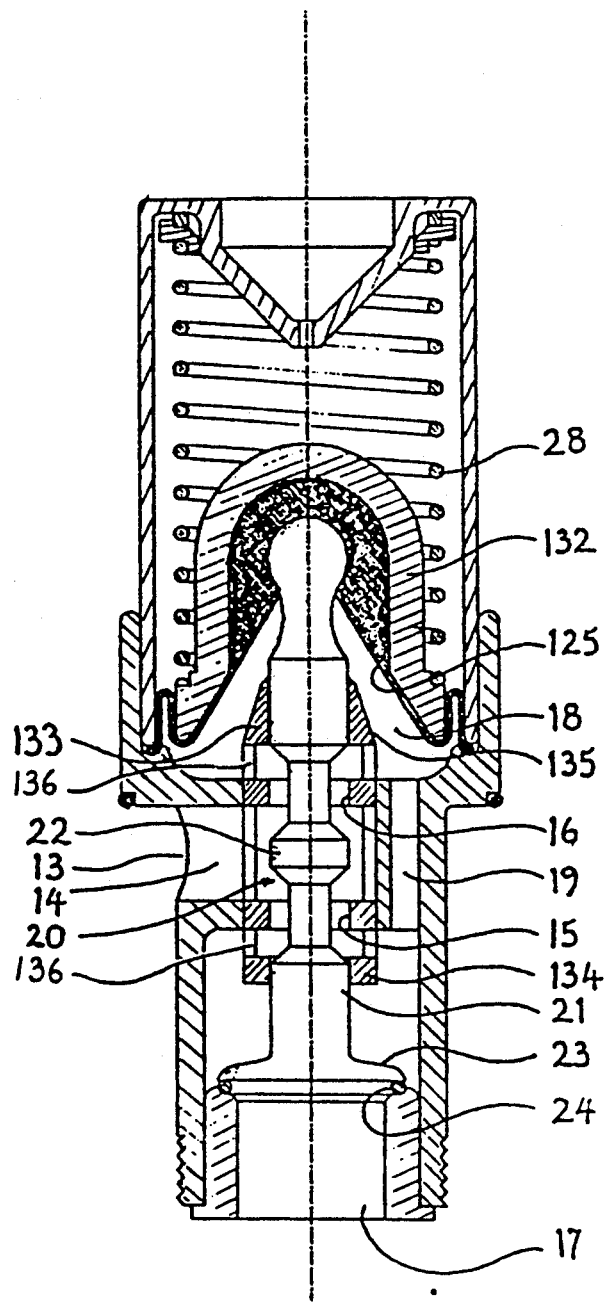
FIG. 4 is a sectional elevation of a pressure regulator according to the second embodiment.

The second embodiment as shown at FIG. 4 is of a similar form to that of the first embodiment except that the enlarged head of the collapsible closure 26 and the support element 20 of the first embodiment is replaced by a flexible diaphragm 125 which may be formed of an elastomeric material which is supported by a central boss 132 receivable over the end of the support 20 element adjacent the other end of the tubular body and which receives the innermost end of the spring 28. In addition the tubular body is formed as a two part body. The ports 15 and 16 are accommodated within a tubular element 133 axially supported between a pair of axially opposed apertures provided in the walls of the chamber 13 and the tubular element 133 is formed with axial extensions 134 and 135 which slidably support the support element to each side of the ports. The relief flutes 31 of the first embodiment are substituted by ports 136 in tubular element 133.

It should be appreciated that the scope of the present invention need not be limited to the particular scope of the embodiment described above.

The claims defining the invention are as follows; I claim:

1. An in-line pressure regulator comprising a housing having an inlet and an outlet, said housing providing a first chamber open to the inlet, the first chamber being provided with a pair of substantially opposed ports which open to a second chamber, the second chamber having a third port opening to the outlet, an axial support element movable through the pair of ports and received within the first and second chambers, the support element supporting a pair of valve members wherein a valve member is associated with each of the pair of ports, the support element being movable within the first and second chambers to vary the extent of engagement of the pair of valve members with the pair of ports, said support element further supporting a third valve member at one end which is associated with the third port, said support element being biased to an end position at which the pair of ports are open, and the third port is closed, said support element further supporting a pressure surface at the other end which is in the second chamber, whereby the force exerted by fluid pressure in the second chamber on the support element counteracts the biasing force applied thereto to rapidly move the support element from its end position to a regulating position where the pair of valves are moved proximate their respective ports to vary the degree of opening of the ports in accordance with the fluid pressure applied at the inlet.

2. An in-line pressure regulator as claimed at claim 1 wherein locations of the support element when at its end position and regulating position are axially spaced such that when the support element is at its regulating position the third valve member is spaced clear of the third port such that there is substantially no throttling of the fluid flow through the third port.

3. An in-line pressure regulator as claimed at claim 1 wherein the biassing force is capable of being varied.

* * * * *